United States Patent
Jacobs et al.

[11] Patent Number: 5,721,067
[45] Date of Patent: Feb. 24, 1998

[54] RECHARGEABLE LITHIUM BATTERY HAVING IMPROVED REVERSIBLE CAPACITY

[76] Inventors: James K. Jacobs, The Electrofuel Manufacturing Co. 21 Hanna Avenue., Toronto, Canada; Sankar Dasgupta, The Electrofuel Manuf. Co. 21 Hanna Avenue., Toronto, Canada

[21] Appl. No.: 604,220

[22] Filed: Feb. 22, 1996

[51] Int. Cl.$^6$ .................................................. H01M 10/40
[52] U.S. Cl. .................. 429/60; 429/218; 429/223; 429/224
[58] Field of Search .................... 429/9, 60, 209, 429/218, 220, 223, 224, 194; 29/623.1

[56] References Cited

U.S. PATENT DOCUMENTS

| | | | |
|---|---|---|---|
| 4,980,250 | 12/1990 | Takahashi et al. | 429/194 |
| 5,162,176 | 11/1992 | Herr et al. | 429/194 |
| 5,238,760 | 8/1993 | Takahashi et al. | 429/194 |
| 5,340,670 | 8/1994 | Takami et al. | 429/194 |
| 5,422,203 | 6/1995 | Guyomard et al. | 429/194 |
| 5,432,029 | 7/1995 | Mitate et al. | 429/194 |
| 5,436,093 | 7/1995 | Huang et al. | 429/217 |
| 5,595,837 | 1/1997 | Olsen et al. | 429/194 |
| 5,605,772 | 2/1997 | Yazami et al. | 429/190 |

*Primary Examiner*—Anthony Skapars

[57] ABSTRACT

An improved rechargeable lithium battery is described comprising a transition metal compound as cathode active material and carbonaceous particles as anode active material, having prior intercalated lithium ions in the carbonaceous particles in the anode of the assembled lithium battery, thereby reducing the weight of the cathode active material required. The rechargeable lithium battery has increased energy density per unit weight and per unit volume.

12 Claims, 2 Drawing Sheets

RECHARGEABLE LITHIUM BATTERY HAVING IMPROVED REVERSIBLE CAPACITY

FIELD OF INVENTION

This invention is related to rechargeable non-aqueous lithium batteries.

BACKGROUND TO THE INVENTION

Most rechargeable lithium ion batteries have a negative electrode containing elemental lithium, which is usually intercalated in some carbonaceous substance, a positive electrode bearing a chalcogenide, which is capable of incorporating lithium ions in its structure, an electrolyte containing mobile lithium ions, located between the negative and positive electrodes and, optionally, a separator. The positive electrode also contains lithium either as ions incorporated in the structure of the chalcogenide or as a lithium compound having dissociable lithium ions ready to be incorporated in the structure of the chalcogenide, a binder mixed with the chalcogenide, and optionally carbon added to increase the conductivity of the mixture. The chalcogenide in the positive electrode is usually a transition metal oxide but may also be a transition metal sulphide. In some instances the chalcogenide may be replaced with a suitable organic compound. The electrolyte is commonly a solid organic polymer or a non-aqueous liquid, which has a lithium salt dissolved in it or contains dissociable lithium ions in some other form. The electrolyte may also be a microporous solid polymer which has been impregnated with an organic liquid containing a dissociable lithium salt. The electrolyte which is non-conductive of electrons, provides ionic passage for the lithium ions. Lithium ions move from the elemental lithium containing negative electrode or anode to the transition metal oxide containing positive electrode or cathode, on discharge of the battery. Lithium ions are moved from the cathode or positive electrode through the electrolyte to the negative electrode in the charging step.

Lithium batteries often utilize carbonaceous particles which are capable of intercalating lithium ions to serve as the cathode active material in the negative electrode. It is common practice that the carbonaceous particles provided in the negative electrode and compacted into a layer with the aid of an organic binder, are initially devoid of lithium ions. The lithium ions to be utilized in the battery are usually added as a component in the transition metal oxide capable of incorporating lithium ions in its structure in the positive electrode, and in the non-aqueous lithium bearing electrolyte. It is to be noted that this procedure is common in assembling planar, spirally wound and button shaped rechargeable lithium batteries. The assembled lithium battery is first charged by applying a voltage of about 4.5 volts between the electrodes of the lithium battery to move the lithium ions in the positive electrode for intercalation in the carbonaceous particles constituting the negative electrode. Most of the lithium added in the positive electrode can be moved by applying an electric charge, however, there is a limit of the lithium concentration within the transition metal oxide below which the oxide crystal structure is irreversibly changed. Furthermore, the first charging of the assembled battery is a slow process to be conducted under carefully controlled conditions.

A portion of the lithium ions moved out of the lithium-transition metal compound serving as the positive active material, by the imposed external potential for intercalation in the carbonaceous particles, will be permanently lodged in or attached to the surface of the carbonaceous particles serving as the negative active material, or will be appended to the interface between the carbonaceous particles and the non-aqueous electrolyte. The type of bonding by which a portion of the lithium ion becomes immobilizable is not known exactly; the bonding of the immobilizable lithium may be related to the structure of the carbonaceous particles or to the nature of the bonding of the mobile lithium ion in the electrolyte, or to the interaction between the lithium bearing electrolyte and the lithium intercalated in the carbonaceous particles or to similar features of the lithium battery, however, such immobilizable portion of the lithium ion initially present in the rechargeable lithium battery is lost to subsequent charging-discharging process steps. The portion of the lithium ions that becomes non-mobilizable in subsequent charging-discharging process steps usually constitutes 20–30% or even higher, of the total amount of lithium contained in the rechargeable lithiumbattery and is usually referred to as the irreversible capacity loss of the lithium battery. The non-mobilizable lithium portion, that is the irreversible capacity, will thus be influenced by many factors such as the sites available for the lithium ion for intercalation, i.e. the nature of the carbon particles utilized, the nature and type of non-aqueous lithium bearing electrolyte employed, as well as the kind of transition metal oxide utilized in the positive electrode. U.S. Pat. No. 5,340,670 issued to Norio Takami et al. on Aug. 23, 1994, describes as the negative active material in a rechargeable lithium battery, graphite particles obtained in a high temperature treatment step and of specific crystal structure, having advantageous properties with respect to irreversible capacity loss. U.S. Pat. 5,432,029 issued to Takehito Mitate et al. on Jul. 11, 1995, teaches the utilization of copper oxide attached to the graphite or similar carbonaceous particles incorporated in the negative electrode for diminishing the irreversible capacity loss in a rechargeable lithium battery. Dominique Guyomard et al. in U.S. Pat. No. 5,422,203 issued on Jun. 6, 1995, describe a lithium bearing electrolyte composition to be utilized for reducing the irreversible capacity loss in a lithium battery. The above are merely listed as examples of attempts of defining the nature of irreversible capacity loss in a rechargeable lithium battery and methods for diminishing such irreversible capacity losses.

It can be seen that the irreversible capacity loss of a rechargeable lithium battery may be related to both the negative active material and to the positive active material. It is to be noted that the type of irreversibility associated with the negative electrode and its interface with the electrolyte is different from the irreversibility exhibited by the positive active material in the positive electrode, however, both kinds of irreversibilities are usually compensated by adding an excess amount of lithium containing transition metal compound to the battery. The excess lithium-transition metal compound is a necessary component of a conventional lithium battery but is not taking part in subsequent charging-recharging steps and may amount to 25% or more extra battery weight. The mobilizable lithium ion portion in the rechargeable lithium battery, related to the carbonaceous particles in the negative electrode, is usually referred to as the anode specific reversible capacity measured in milliampere-hours per gram of carbonaceous particles ($mAh/g_a$), and that related to the transition metal compound the positive electrode, is usually referred to as the cathode specific reversible capacity measured in milliampere-hours per gram of transition metal compound ($mAh/g_c$).

It is also to be noted that the first charging step due to its prolonged nature and controlled conditions, is costly even if excess lithium is added in the form of extra lithium-transition metal compound. There are known methods for incorporating lithium in the carbonaceous particles prior to assembling the lithium battery comprising an electrolyte and negative and positive electrodes. U.S. Pat. No. 4,980,250 issued to Yuzuru Takahashi et al. on Dec. 25, 1990, describes carbon moulded articles made of carbon fibre or carbon powder having lithium introduced electrolytically in the moulded article prior to the incorporation of the carbon moulded article into a lithium battery. Cheng-Kuo Huang et al. in U.S. Pat. No. 5,436,093, teach a method for introducing lithium into carbon particles from a liquid electrolyte containing lithium ions by the application of more than one electrical charging steps. The carbon particles are carried by a nickel grid acting as the negatively charged electrode. The positive electrode in the pretreatment process is at least one lithium sheet immersed in the electrolyte. The lithium containing carbon particles are withdrawn from the pretreating electrolyte and are used subsequently as negative active material in a rechargeable lithium battery. There is, however, no clear indication that all or any portion of the lithium introduced by the above described methods contributes to the reversible anode capacity of the carbon particles in subsequent repeated charging-discharging of the obtained lithium battery, thereby eliminates the need for adding an extra amount of lithium ion containing transition metal compound to operate the rechargeable lithium ion battery satisfactorily, and hence provide a lighter lithium battery.

SUMMARY OF THE INVENTION

One of the objects of the present invention is to provide a rechargeable lithium battery which incorporates the non-mobilizable lithium ion portion in the negative electrode coupled to the non-aqueous electrolyte in the lithium battery in the stage prior to the final packaging of the rechargeable lithium battery and prior to the full charging of the battery, thereby avoiding having to add extra weight in the positive electrode.

Another object of the present invention is to reduce the length of time required in the first full charging step of the assembled lithium battery.

Yet another object of the present invention is to provide substantially all the mobilizable lithium ion portion as that contained in the positive electrode and the dissociable lithium ion in the non-aqueous electrolyte of the resulting assembled lithium battery, and thereby obtaining a lithium battery having high energy density per unit weight.

A rechargeable lithium battery is described hereinbelow which has improved reversible capacity. The improved rechargeable lithium battery has a positive electrode comprising a transition metal compound capable of incorporating lithium ions in its structure as the positive active material in the cathode, the cathode having a cathode specific reversible capacity (mAh/$g_c$), a negative electrode containing carbonaceous particles capable of intercalating lithium ions as the negative active material in the anode, the anode having an anode specific reversible capacity (mAh/$g_a$), as well as a non-aqueous electrolyte conductive of lithium ions, and a total amount of lithium ions distributed between the electrodes and the non-aqueous lithium ion bearing electrolyte. In the improved rechargeable lithium battery of the present invention the weight of the negative active material in the negative electrode($w_a$) and the weight of the positive active material in the positive electrode ($w_c$) are adjusted such that the ratio of the anode specific reversible capacity multiplied by the weight of the negative active material contained in the rechargeable lithium battery to the cathode specific reversible capacity multiplied by the weight of the positive active material contained in the rechargeable lithium ion battery has a value between 0.85 and 1.15, that is mAh/$g_a$×$w_a$: mAh/$g_c$×$w_c$=0.85–1.15. The improved rechargeable lithium battery has an energy density in excess of 320 watt.hour/liter or 130 watt.hour/kg.

DETAILED DESCRIPTION OF THE PREFERRED EMBODIMENTS

Figure 1:
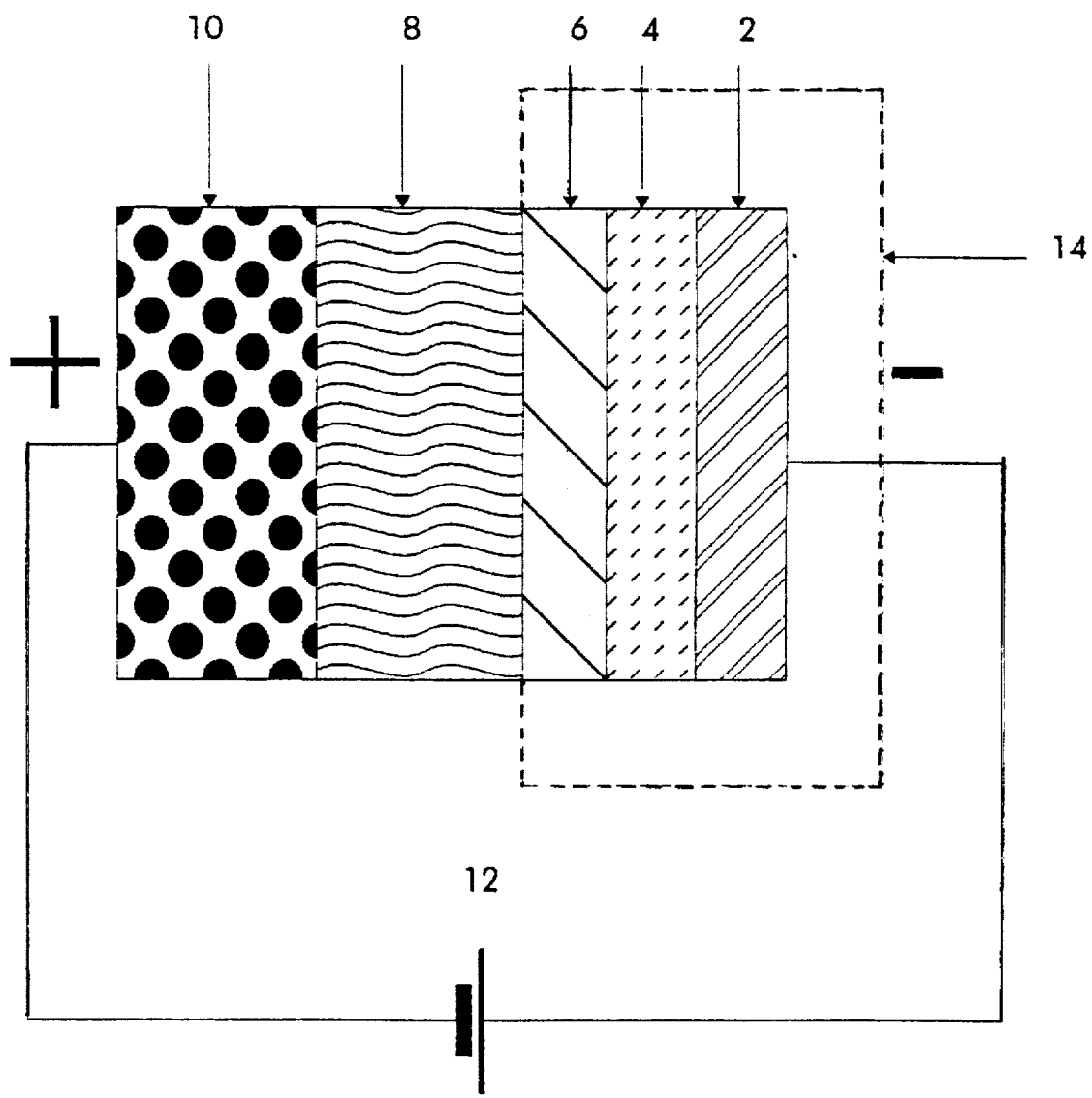
FIG. 1 is a schematic circuit diagram illustrating the initial transfer of lithium into the anode of the lithium battery according to the present invention.

As it has been briefly mentioned above, the energy density per unit weight of a rechargeable lithium battery is of significance in the commercial utilization of lithium batteries, in particular of planar lithium batteries. One of the desired features in lithium battery technology is to reduce the weight of the battery components as much as it is possible without loss of battery efficiency and output.

The transition metal compound utilized in rechargeable lithium batteries is usually a transition metal chalcogenide, most frequently a transition metal oxide but may also be a transition metal sulphide. The composition of the transition metal oxide incorporating lithium ions in its structure depends on the type and kind of transition metal oxide utilized. For example, lithium-cobalt oxide has a composition of $Li_xCoO_2$, where x is less than 1, similarly lithium bearing nickel oxide has a composition of $Li_xNiO_2$. On the other hand, lithium bearing manganese oxide may be described as $Li_yMn_2O_4$, where 0<y<2. The transition metal compound may also be an oxide of chromium, copper, vanadium, tungsten or alloys of the above mentioned metals with other metals, which are capable of incorporating lithium ions in their structure. The most often utilized transition metal sulphide is $TiS_2$, but other transition metal sulphides, such as iron sulphide, may also serve as cathode active materials. Some organic compounds which are capable of incorporating lithium ions reversibly and are also electronic conductors, may also be utilized in the positive electrode of a rechargeable lithium battery. In theory, virtually all the lithium ions incorporated in the structure of transition metal compound may be moved by an imposed direct potential, however, as mentioned above, below a certain lithium concentration that is characteristic of each transition metal compound, the crystal structure, in particular the lattice dimensions of the transition metal compound is likely to change irreversibly. Hence a certain portion of the lithium in the battery has to be retained in the positive electrode being incorporated in an unavoidable extra cathode material weight. The positive electrode may also contain fine carbon to increase the electrical conductivity of the electrode and a binder substance. The positive electrode is usually in contact with some form of a current collector.

The cathode or positive electrode of a rechargeable lithium battery will have a reversible capacity depending on the nature of the cathode active material contained in the electrode and to a lesser degree, on the binder. The cathode specific reversible capacity is usually calculated per unit weight of the cathode active material in the electrode and is expressed in milliampere-hours per gram (mAh/$g_c$).

The non-aqueous electrolyte of a rechargeable lithium battery is usually either a solid polymer electrolyte containing lithium in a dissociable form, or a porous polymer separator impregnated with an organic liquid containing dissolved therein a lithium salt capable of dissociating. For obvious reasons, the electrolyte is conductive only of ions and non-conductive of electrons. There are various ways to keep the electrolyte weight in the battery as low as possible, which is beyond the scope of the present invention.

The negative electrode of a rechargeable, or secondary lithium battery usually has some form of carbonaceous particles capable of intercalating lithium, as the negative active material. The carbonaceous particles most often utilized in a rechargeable lithium battery include graphite, glassy or pyrolytic carbon, petroleum coke, carbon fibres and any other form of carbon particles that can intercalate lithium under normal circumstances. The preferred particle size of the carbonaceous particles is less than 60µm but greater than 5 µm. It is known that the lithium intercalated in carbon has the general formula of $LiC_6$ but other lithium to carbon ratios have also been recorded. It is also known that a portion of the lithium subsequent to the first introduction of lithium into the carbonaceous particles, that is in the initial lithium charging step of a lithium battery, is irreversibly retained in the carbon structure. As discussed above, it is not known exactly whether the irreversibly bonded lithium attaches itself to some structural elements of the carbon or to the surface of the particles, or is located on the interface between the carbonaceous particles and the lithium ion conducting electrolyte. It has been observed that such irreversible capacity loss may depend on the type and history of the carbonaceous particles, on the binder substance utilized, on the nature of the electrolyte composition and so forth. Whatever is the reason, a portion of the transferred lithium is lost for subsequent battery charging-discharging process steps. As mentioned hereinabove, in conventional rechargeable lithium batteries the irreversibly bonded lithium is compensated by an extra amount of lithium-transition metal compound added in the cathode, thus increasing the total weight of the battery.

The anode or negative electrode of a rechargeable lithium battery will have a reversible capacity depending on the nature of the cathode active material, that is on the type of carbonaceous particles contained in the anode and to a limited degree, on the binder. The anode specific reversible capacity is usually calculated per unit weight of the anode active material present in the electrode and is expressed in milliampere-hours per gram ($mAh/g_a$).

It is known to introduce lithium into the carbonaceous particles by various methods prior to the carbonaceous material being incorporated in the anode of the lithium battery, however it is believed, these methods have not been successful in eliminating an additional irreversible capacity loss that occurs during the first, charging of the lithium battery. In other words, an extra amount of lithium-transitional metal compound is still needed over and above the reversibly incorporated lithium requirement of the carbonaceous particles in the anode.

It has now been surprisingly found that if the lithium is added electrolytically during the first charging of the assembled rechargeable lithium battery in such a manner that the lithium transferred from the positive electrode for initially charging the anode, is replaced from a third lithium electrode, no extra amount of lithium-transition metal compound is required to compensate for the irreversible capacity loss in the anode. The improved rechargeable lithium battery of the present invention undergoes a first charging or pre-charging step of the battery in an electrical circuit which incorporates a third lithium containing electrode, which is most often an elemental lithium bearing electrode. The third electrode is separated from the lithium-transition metal compound containing cathode by another non-aqueous lithium ion containing electrolyte but is electrically (ionically) in contact with it. In practice, a positive potential is applied to the third, usually elemental lithium containing electrode, thereby forcing lithium ions to enter into the electrolyte separating the third electrode from the lithium-transition metal compound containing cathode of the lithium battery. The arriving lithium ions, in turn, force an equivalent amount of lithium ions to leave the cathode to enter by way of the electrolyte within the lithium battery into the anode to be intercalated by the carbonaceous particles in the negative electrode. As usual in the charging step, the anode carries a negative potential, thus closing the circuit. The pre-charging is conducted at the usual charging potential of a lithium battery, that is at about 4.5 volts at the conventionally required current density for an appropriate length of time. The assembled pre-charged lithium battery is disconnected from the third electrode and the additional or temporary electrolyte, and is subsequently sealed and packaged with appropriate current collectors and electric leads in the usual manner.

The temporary electrolyte in contact with the third electrode containing a source of lithium ions may have the same composition as the electrolyte of the assembled rechargeable lithium battery, or may be a different electrolyte such as an organic liquid having a lithium salt dissolved therein. The third electrode may be a lithium foil immersed in the organic liquid or an alloy of lithium or may be another lithium ion containing compound. Any convenient lithium source that is capable of providing lithium ions to the positive electrode of the rechargeable lithium battery and can be incorporated in an electrical circuit, is suitable for facilitating the pre-charging of the rechargeable lithium battery in accordance with the present invention. FIG. 1 represents a schematic diagram of the electrical circuit of the pre-charging process step of the battery, where 2 is the negative electrode bearing carbonaceous particles which do not contain any lithium before the pre-charging process step, 4 represents the lithium battery electrolyte and 6 is the lithium-transition metal compound containing positive electrode. The positive electrode is in contact with the pre-charging temporary electrolyte 8, which in turn is in electrolytic contact with the third, usually but not necessarily, elemental lithium containing electrode 10. In the preferred embodiment the third electrode is lithium metal or an elemental lithium containing alloy. Reference numeral 12 represents the external potential source, providing the current for the pre-charging process step of the rechargeable lithium battery. The broken line 14 around the schematically drawn rechargeable lithium battery components represents conventional sealers, current collectors and electrical leads which encase the rechargeable lithium battery subsequent to the pre-charging step.

For the sake of clarity, in the present description pre-charging of the lithium battery is understood to mean the first transfer of lithium ions to be intercalated in the carbonaceous particles of the anode or negative electrode, by means of applying a positive electrical potential to a third electrode which acts as a source of lithium ions. In the pre-charging step the third electrode as connected by means of a non-aqueous electrolyte referred to as temporary electrolyte, to the positive electrode of the lithium battery. The temporary electrolyte is disconnected from the lithium battery after the pre-charging has taken place.

It is noted that the rechargeable lithium battery may not be fully charged in the pre-charging step and additional charging of the lithium battery may still be required after the rechargeable lithium battery has been separated from the third electrode and its electrolyte, sealed and packaged in the conventional manner. Whether the battery is fully charged or only partially charged in the pre-charging step, depends on the composition of the cathode active material and may also be dictated by other aspects of convenience. Optionally, the fully pre-charged lithium battery is allowed to discharge to attain its conventional low voltage level and is subsequently packaged and sealed.

One of the important features of the present invention is that the bonding between the electrolyte, shown as 4 on FIG. 1, and the lithium bearing carbonaceous particle-containing anode 2 formed in the pre-charging step, is not disturbed or broken in the subsequent sealing and packaging of the rechargeable lithium battery. In other words, the lithium is transferred through the same electrolyte-anode interface in the pre-charging step as in subsequent charging-discharging steps taking place in utilizing the rechargeable lithium battery of the present invention.

The above described pre-charging process may be applied to planar, spirally wound and button-shaped rechargeable lithium batteries.

The specific reversible capacity of a rechargeable lithium battery refers to the total reversible capacity of the assembled lithium battery and is expressed in milliampere-hours per the total weight of the active components of the lithium battery, that is the sum of the weights of the anode active material, the cathode active material and the non-aqueous electrolyte comprised in the lithium battery (mAh/$g_r$). The reversible capacity of the rechargeable lithium battery made in accordance with the present invention is usually not much lower than the value of the lesser of the reversible capacities of the electrodes. It should be noted that in practical applications the values of the electrode reversible capacities within a rechargeable lithium battery are similar to one another.

The present invention will now be illustrated by working examples.

EXAMPLE 1

A commercially available planar rechargeable lithium battery A, having lithium-cobalt oxide as cathode active component and graphite as anode active component, was charged in the conventional manner by applying 4.2 volts to its external electrical leads at a current level controlled to complete charging in a 24 hour period. After charging battery A exhibited full battery voltage of 4.05 volts. Battery A had conventional anode film made of graphite of average particle size of 15 µm, containing 5 wt % polyvinylidene fluoride binder. The electrolyte of battery A was porous polyethylene impregnated with ethylene carbonate-diethyl carbonate mixed in 1:1 ratio, containing LiPF$_6$ in 1.0 mole concentration. It is known that conventional lithium-cobalt oxide has specific reversible capacity of 123 mAh/g. The specific anode reversible capacity of the graphite utilized in the battery is 370 mAh/g. The reversible capacity of battery A was measured in the usual manner and the component layers of battery A were subsequently separated and analyzed. The specific reversible capacity of lithium battery A was then obtained as 52 mAh/$g_r$; in the calculation $g_r$ was the sum total of the weights of the anode active graphite, cathode active lithium-cobalt oxide and the impregnated microporous polyethylene electrolyte comprised in a 100 cm$^2$ area of battery A. The 100 cm$^2$ segment of battery A was found to contain 1.35 g anode active graphite particles and 6.08 g cathode active lithium-cobalt oxide, that is the weight ratio of graphite to lithium-cobalt oxide in the anode and cathode layers respectively, was found to be 4:18. It was calculated that the value of the ratio of the anode capacity to the cathode capacity of battery A, that is: mAh/$g_a$×w$_a$ divided by mAh/$g_c$×w$_c$=370×1.35 : 123×6.08=0.67. This ratio is well below 1, thus indicating that excess weight is carried in the cathode.

Battery B was made up of the same commercially available lithium-cobalt oxide and graphite particles, utilizing the same amount of polyvinylidene fluoride binder and other additives in the anode and cathode, respectively, as in battery A, however, the weight ratio of the anode active graphite particles to the cathode active lithium-cobalt oxide was 4:13.2. The electrolyte of battery B had the same composition as that of battery A, but the weight per unit area of battery B was lower than that of battery A. The assembled lithium battery B was immersed in an electrolyte solution made of ethylene carbonate-diethyl carbonate, containing LiPF$_6$ in 1 Molar concentration. A 1 mm thick 100 mm wide lithium foil mounted on a stainless steel carrier was also immersed in the electrolyte solution. A direct potential of 4.2 volts was applied between the lithium foil-third electrode and the anode of lithium battery B containing graphite particles as negative active material, the latter having negative polarity in the circuit. The direct current was applied until the anode of lithium battery B attained a potential of 2.9 volts against the lithium-cobalt oxide bearing cathode of lithium battery B. Battery B was then disconnected from the pre-charging direct potential and removed from the temporary electrolyte. Battery B was subsequently fitted with appropriate current collectors and electrical leads, and sealed in the conventional manner. Battery B was then charged to the full potential value it was capable of attaining, i.e. 4.05 volts, in conventional manner.

Battery B was subjected to several charging-discharging cycles and it was found to perform just as satisfactorily as battery A under similar cycling conditions.

Figure 2:
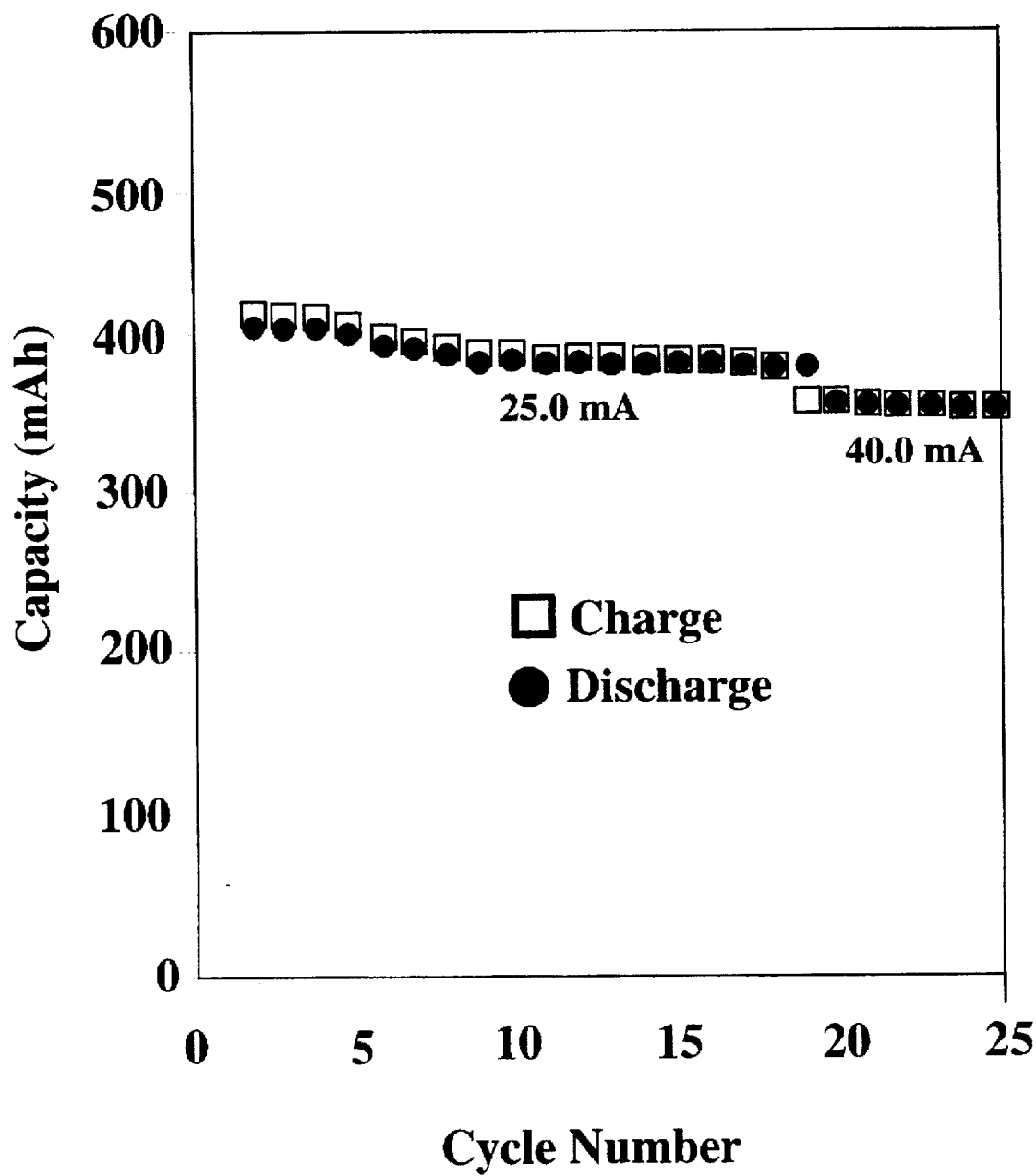
FIG. 2 shows the performance of a lithium battery of the present invention in repeated charging-discharging cycles.

In a subsequent series of tests the capacity of battery B was first measured in charging and discharging cycles at 25 mA current, which was then followed by charging and discharging cycles conducted at 40 mA current. The reversible capacities manifested in the cycling of battery B are shown on FIG. 2, indicating that the rechargeable lithium battery made in accordance with the present invention has high capacity and is capable of rendering reliable service.

Following the cycling series, battery B was dismantled and the relevant component layers in a 100 cm$^2$ area were weighed and analyzed. It was found that battery B contained 1.35 gram of graphite and 4.42 grams of lithium-cobalt oxide in the corresponding battery B cathode layer volume. Thus the ratio of the anode and cathode reversible capacities was found to be: mAh/$g_a$×w$_a$ : mAh/$g_c$×w$_c$=370×1.35 : 123×4.42=0.92, indicating a substantial increase in the energy output per weight of battery B when compared to battery A.

The specific reversible capacity of battery B was found to be 64 mAh/$g_r$, which also shows an increase in comparison to battery A.

The energy density of battery B was found to be 335 watt.hour/liter and 142 watt.hour/kg, compared to 272 watt.hour/liter and 116 watt.hour/kg of battery A.

EXAMPLE 2

A commercially available planar rechargeable lithium battery C, having lithium-manganese oxide as cathode active component and graphite as anode active component, was charged in the conventional manner by applying 4.2 volts to its external electrical leads at a current level controlled to complete charging in a 24 hour period. After charging battery C exhibited full battery voltage of 3.85 volts. Battery C had conventional anode film made of graphite of average particle size of 15 μm, containing 5 wt % polyvinylidene fluoride binder. The electrolyte of battery C was porous polyethylene impregnated with ethylene carbonate-diethyl carbonate mixed in 1:1 ratio, containing LiPF$_6$ in 1.0 mole concentration. It is known that conventional lithium-manganese oxide has specific reversible capacity of 142 mAh/g. The specific anode reversible capacity of the graphite utilized in the battery was 370 mAh/g. The specific reversible capacity of lithium battery C was found to be 57 mAh/g$_t$; in the calculation g$_t$ was the sum total of the weights of the anode active graphite, the cathode active lithium-manganese oxide and the impregnated microporous polyethylene electrolyte comprised in a 100 cm$^2$ area of battery C. The component layers of battery C were subsequently separated and analyzed. In a 100 cm$^2$ segment of battery C the weight ratio of the anode active graphite to the cathode active lithium-manganese oxide in the anode and the cathode layers respectively, was found to be 4:15.7 or 1.35 g to 5.30 g. It was calculated that the value of the ratio of the anode capacity to the cathode capacity of battery C, that is: mAh/g$_a$×w$_a$ divided by mAh/g$_c$×w$_c$=370×1.35 : 142×5.30=0.66. This ratio is well below 1, thus indicating that excess weight is carried in the cathode of battery C.

Battery D was made up of the same commercially available lithium-manganese oxide and graphite particles, utilizing the same amount of polyvinylidene fluoride binder and other additives in the anode and cathode respectively, as in battery C, however, the weight ratio of the anode active graphite particles to the cathode active lithium-manganese oxide was adjusted to 4:11.6. The electrolyte of battery D had the same composition as that of battery C. Thus the weight per unit area of battery D was lower than that of battery C. The assembled lithium battery D was immersed in an electrolyte solution made of ethylene carbonate-diethyl carbonate, containing LiPF$_6$ in 1 Molar concentration. A 1 mm thick 100 mm wide lithium foil mounted on a stainless steel carrier was also immersed in the electrolyte solution. A potential of 4.2 volts was applied between the lithium foil-third electrode and the anode of the lithium battery containing graphite particles as negative active material, the latter having negative polarity in the circuit. The current was applied until the anode of lithium battery D attained a potential of 2.75 volts against the lithium-manganese oxide bearing cathode of the lithium battery D. Battery D was then disconnected from the pre-charging potential and removed from the electrolyte. Battery D was subsequently fitted with appropriate current collectors and electrical leads, and sealed in the conventional manner. Finally, battery D was charged in conventional manner to the full potential it was capable of attaining, i.e. 3.85 volts.

Battery D was subjected to 10 charging-discharging cycles and it was found to perform just as satisfactorily as battery C under similar cycling conditions.

Following 10 cycles battery D was dismantled, the relevant component layers in a 100 cm$^2$ area weighed and analyzed. It was found that battery D contained 1.35 grams of graphite particles and 3.92 grams of lithium-manganese oxide in the corresponding cathode layer volume of battery D. Thus the ratio of the anode and cathode reversible capacities was found to be: mAh/g$_a$×w$_a$: mAh/g$_c$×w$_c$=370×1.35 : 142×3.92=0.90, indicating a substantial increase in the energy output per weight of battery D in comparison with battery C.

The specific reversible capacity of battery D was found to be 70 mAh/g$_t$, which also shows an increase in comparison with battery C.

The energy density of battery D was found to be 345 watt.hour/liter and 146 watt.hour/kg, compared to 284 watt.hour/liter and 121 watt.hour/kg of battery C.

EXAMPLE 3

The capacity of rechargeable lithium battery E constructed in a conventional manner of commercially available graphite and lithium-nickel oxide as the respective anode and cathode active material, and lithium ion conducting electrolyte made of polyethylene oxide containing LiPF$_6$ in 1 Molar concentration, was to be compared to the capacity of a rechargeable lithium battery containing similar components as battery E, made according to the present invention. The graphite utilized in the anode of the batteries was similar in quality and particle size as those in Examples 1 and 2. The lithium-nickel oxide-containing conventional battery E was fully charged and its composition and performance parameters noted in the similar manner as was done for batteries A, B, C, and D. The specific reversible capacity of lithium-nickel oxide is known to be 147 mAh/g. The weight ratio of graphite to lithium-nickel oxide in conventional battery E was 4:15.1, or 1.35 g graphite particles and 5.10 g lithium-nickel oxide were contained in a 100 cm$^2$ area of battery E. The value of ratio of mAh/g$_a$×w$_a$: mAh/g$_c$×w$_c$=370×1.35 : 147×5.10 was found to be 0.67 in the case of battery E. The specific reversible capacity of battery E was calculated as 59.5 mAh/g$_t$, based on the total weights of the electrode active materials and the electrolyte contained in battery E.

Battery F was made up to contain the same type of commercially available electrode active and electrolyte materials as battery E, however, the weight ratio of the anode active carbon to the cathode active lithium-nickel oxide was in the case of battery F: 4:11.2, in all other respects battery F was similar to lithium battery E. The assembled lithium battery F was immersed in an electrolyte solution made of ethylene carbonate-diethyl carbonate, containing LiPF$_6$ in 1 Molar concentration. A 1 mm thick 100 mm wide lithium foil mounted on a stainless steel carrier was also immersed in the electrolyte solution. A potential of 4.2 volts was applied between the lithium foil-third electrode and the anode of the lithium battery containing graphite particles as negative active material, the latter having negative polarity in the circuit. The current was applied until the anode of lithium battery F attained a potential of 2.7 volts against the lithium-nickel oxide bearing cathode of lithium battery F; it was subsequently disconnected from the pre-charging potential and removed from the electrolyte. The partially charged battery F was then fitted with appropriate current collectors and electrical leads, and sealed in the usual manner. Finally, battery F was charged in conventional manner to the full potential it was capable of attaining, i.e. 3.80 volts.

Battery F was subjected to 10 charging-discharging cycles and it was found to perform just as satisfactorily as battery E under similar cycling conditions.

Following 10 cycles battery F was dismantled, the relevant component layers in a 100 cm$^2$ area weighed and analyzed. It was found that battery F contained 1.35 grams of graphite particles as anode active material and 3.78 grams of lithium-nickel oxide in the corresponding cathode layer volume of battery F. Thus the ratio of the anode and cathode reversible capacities was found to be: mAh/g$_a$×w$_a$: mAh/g$_c$×w$_c$=370×1.35 : 147×3.78=0.90, indicating a substantial increase in the energy output per weight of battery F in comparison with battery E.

The specific reversible capacity of battery F was found to be 73.1 mAh/g$_c$, which also shows an increase in comparison with battery E.

The energy density of battery F was found to be 350 watt.hour/liter and 151 watt.hour/kg, compared to 291 watt.hour/liter and 124 watt.hour/kg of battery E.

Results characterizing the lithium batteries discussed in Examples 1, 2 and 3 are shown in Table 1.

It has been shown that rechargeable lithium batteries which have been pre-charged in accordance with the present invention perform well, furthermore, these lithium batteries have reduced weight compared to conventional rechargeable lithium batteries, and hence have increased energy density per battery weight and volume.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations maybe made in those embodiments by workers skilled in the art without departing from the scope of the present invention as defined by the following claims.

TABLE 1

| Battery | Wt of Cathode Reactive Material per 100 cm$^2$ | | Voltage | Watt. hour per liter | Watt. hour per kg |
|---|---|---|---|---|---|
| A | Li$_x$CoO$_2$ | 6.08 g | 4.05 | 272 | 116 |
| B | Li$_x$CoO$_2$ | 4.42 g | 4.05 | 335 | 142 |
| C | Li$_y$Mn$_2$O$_4$ | 5.30 g | 3.85 | 284 | 121 |
| D | Li$_y$Mn$_2$O$_4$ | 3.92 g | 3.85 | 345 | 146 |
| E | Li$_z$NiO$_2$ | 5.10 g | 3.80 | 291 | 124 |
| F | Li$_z$NiO$_2$ | 3.78 g | 3.80 | 350 | 151 |

We claim:

1. In an improved rechargeable lithium battery, said rechargeable lithium battery having a positive electrode containing a transition metal compound capable of incorporating lithium ions in its structure as the positive active material, a negative electrode containing carbonaceous particles capable of intercalating lithium ions as the negative active material, a non-aqueous electrolyte conductive of lithium ions, and a total amount of lithium ions distributed between the electrodes and the non-aqueous lithium ion bearing electrolyte, said rechargeable lithium battery having a capacity measured in milliampere-hours per gram weight of battery(mAh/g$_t$), an anode specific reversible capacity (mAh/g$_a$) and a cathode specific reversible capacity (mAh/g$_c$), the improvement comprising that the weight of the negative active material in said negative electrode (w$_a$) and the weight of the positive active material in said positive electrode (w$_c$) are adjusted such that the value of the ratio, denoted by n, of said anode specific reversible capacity multiplied by said weight of the negative active material contained in said rechargeable lithium battery, to said cathode specific reversible capacity multiplied by said weight of the positive active material contained in said rechargeable lithium ion battery, is expressed as mAh/g$_a$×w$_a$ : mAh/g$_c$× w$_c$=0.85<n<1.15, and that the weight of the negative active material in the negative electrode (w$_a$) is adjusted by introducing a portion of said total amount of lithium ions in said rechargeable lithium battery in an assembled state prior to packaging and sealing said battery; thereby providing a rechargeable lithium battery having an energy density of at least 320 watt.hour/liter.

2. A rechargeable lithium battery as claimed in claim 1, wherein said rechargeable lithium battery is a planar battery having energy density of at least 130 watt.hour/kg.

3. A rechargeable lithium battery as claimed in claim 1, wherein said portion of said total amount of lithium ions in said rechargeable lithium battery is introduced by electrolytic means in said carbonaceous particles capable of intercalating lithium ions subsequent to assembling said positive electrode, said negative electrode and said non-aqueous electrolyte conductive of lithium ions comprised in said rechargeable lithium battery, but prior to packaging and sealing said rechargeable lithium battery.

4. A rechargeable lithium battery as claimed in claim 3, wherein said portion of said total amount of lithium ions is introduced in said carbonaceous particles by electrolytic means utilizing a third electrode comprising one of the group consisting of elemental lithium, a lithium alloy and a lithium containing compound.

5. A rechargeable lithium battery as claimed in claim 1, wherein the transition metal compound capable of incorporating lithium ions in its structure is a transition metal chalcogenide.

6. A rechargeable lithium battery as claimed in claim 5, wherein the transition metal chalcogenide capable of incorporating lithium ions in its structure is selected from the group consisting of: manganese oxide, cobalt oxide, nickel oxide, vanadium oxide, chromium oxide, copper oxide, tungsten oxide and intimately mixed oxidic compounds thereof, titanium sulphide and iron sulphide.

7. A rechargeable lithium battery as claimed in claim 1, wherein the non-aqueous electrolyte conductive of lithium ions is a solid polymer electrolyte containing lithium ions.

8. A rechargeable lithium battery as claimed in claim 1, wherein the non-aqueous electrolyte conductive of lithium ions is a microporous polymer impregnated with an organic liquid containing lithium ions.

9. A rechargeable lithium battery as claimed in claim 1, wherein the carbonaceous particles capable of intercalating lithium ions are selected from the group consisting of: petroleum coke, glassy carbon particles, graphite particles and carbon particles, said carbonaceous particles having cross-sectional diameter of less than 60 µm.

10. A rechargeable lithium battery as claimed in claim 1, having cobalt oxide as a transition metal compound capable of incorporating lithium ions in its structure, said cobalt oxide having cathode specific reversible capacity in the range of 123±5 mAh/g.

11. A rechargeable lithium battery as claimed in claim 1, having manganese oxide as a transition metal compound capable of incorporating lithium ions in its structure, said manganese oxide having cathode specific reversible capacity in the range of 142±5 mAh/g.

12. A rechargeable lithium battery as claimed in claim 1, having nickel oxide as a transition metal compound capable of incorporating lithium ions in its structure, said nickel oxide having cathode specific reversible capacity in the range of 147±5 mAh/g.

* * * * *